United States Patent [19]
Ho et al.

[11] Patent Number: 6,139,330
[45] Date of Patent: *Oct. 31, 2000

[54] COMPUTER-AIDED LEARNING SYSTEM AND METHOD

[76] Inventors: Chi Fai Ho, 4816 Cabello Ct., Union City, Calif. 94587; Peter P. Tong, 1807 Limetree La., Mountain View, Calif. 94040

[*] Notice: This patent is subject to a terminal disclaimer.

[21] Appl. No.: 09/037,768

[22] Filed: Mar. 10, 1998

Related U.S. Application Data

[63] Continuation-in-part of application No. 08/618,193, Mar. 19, 1996, Pat. No. 5,779,486, and a continuation-in-part of application No. 08/633,582, Apr. 17, 1996, Pat. No. 5,743,746, and a continuation-in-part of application No. 08/664,023, May 28, 1996, Pat. No. 5,727,951, and a continuation-in-part of application No. 08/675,391, Jul. 2, 1996, Pat. No. 5,863,208, and a continuation-in-part of application No. 08/707,189, Sep. 3, 1996, Pat. No. 5,743,743.

[51] Int. Cl.[7] .............................. G09B 3/00; G09B 7/00; G09B 19/00
[52] U.S. Cl. ..................... 434/322; 434/236; 434/332; 434/353; 434/362
[58] Field of Search ................................ 434/236, 322, 434/323, 332, 353, 362

[56] References Cited

U.S. PATENT DOCUMENTS

| | | | |
|---|---|---|---|
| Re. 36,028 | 1/1999 | Deesen et al. | 434/327 |
| 4,611,996 | 9/1986 | Stoner | 434/202 |
| 4,705,479 | 11/1987 | Maron | 434/335 |
| 4,798,543 | 1/1989 | Spiece | 434/323 |
| 4,867,685 | 9/1989 | Brush et al. | 434/234 |
| 4,926,255 | 5/1990 | Von Kohorn | 348/13 |
| 5,004,966 | 4/1991 | Eakin | 318/446 |
| 5,035,625 | 7/1991 | Monson et al. | 434/332 |
| 5,168,372 | 12/1992 | Sweetser | 348/5.5 |
| 5,173,051 | 12/1992 | May et al. | 434/118 |

(List continued on next page.)

FOREIGN PATENT DOCUMENTS 08196741 8/1996 Japan .

OTHER PUBLICATIONS

Success Maker Courseware Brochure, published by Computer Curriculum Corporation, Dec. 1994.
Active Mind Series from World Wide Web, URL = http://www.broderbund.com/studio/ams.html, 1996.
Logical Journal of the Zoombinis from World Wide Web, URL = http://www.broderbund.com/studio/atoz/zoombini, html, 1996.
Selecting Software by PC Novice Series, vol. 3, Issue 12, p. 51 and 64, 1995.
Computerized Adaptive Testing, Oct. 24, 1994, from World Wide Web, URL = Gopher://Gopher,ETS.org.
Innovation and Technologies, Oct. 21, 1994, from World Wide Web, URL = Gopher://Gopher.ETS.org.
"Interactive Mathematic Instructor's Guide," by Academic Systems, pp. 86 and 114, Aug. 1995.
"High School Learning and Resource Library," by ProOne, photocopy of the box and screen–dump to get 5 pages, 1995.
Guide to Selecting Software by PC Novice, vol.3, Issue 12, pp. 89–92, 1995.

*Primary Examiner*—Jacob K. Ackun
*Assistant Examiner*—John Edmund Rovnak
*Attorney, Agent, or Firm*—Peter Tong

[57] ABSTRACT

A computer-aided learning method and apparatus based on a super-recommendation generator, which is configured to assess a user's or a student's understanding in a subject, reward the user who has reached one or more milestones in the subject, further the user's understanding in the subject through relationship learning, reinforce the user's understanding in the subject through reviews, and restrict the user from enjoying entertainment materials under certain condition, with the entertainment materials requiring a device to fulfill its entertainment purpose. The generator does not have to be configured to perform all of the above functions.

19 Claims, 1 Drawing Sheet

U.S. PATENT DOCUMENTS

| | | | |
|---|---|---|---|
| 5,241,671 | 8/1993 | Reed et al. | 395/600 |
| 5,267,865 | 12/1993 | Lee et al. | 434/350 |
| 5,286,036 | 2/1994 | Barabash | 273/429 |
| 5,306,154 | 4/1994 | Ujita et al. | 434/218 |
| 5,316,485 | 5/1994 | Hirose | 434/322 |
| 5,326,270 | 7/1994 | Ostby et al. | 434/362 |
| 5,372,507 | 12/1994 | Goleh | 434/118 |
| 5,411,271 | 5/1995 | Mirando | 436/9 |
| 5,418,717 | 5/1995 | Su et al. | 704/9 |
| 5,434,562 | 7/1995 | Reardon | 340/825.34 |
| 5,441,415 | 8/1995 | Lee et al. | 434/350 |
| 5,494,444 | 2/1996 | Thayer et al. | 434/362 |
| 5,597,312 | 1/1997 | Bloom et al. | 434/362 |
| 5,616,033 | 4/1997 | Kerwin | 434/118 |
| 5,657,256 | 8/1997 | Swanson et al. | 702/119 |
| 5,681,170 | 10/1997 | Rieber et al. | 434/355 |
| 5,727,950 | 3/1998 | Cook et al. | 434/350 |
| 5,730,604 | 3/1998 | Jay et al. | 434/365 |
| 5,743,743 | 4/1998 | Ho et al. | 434/236 |
| 5,754,939 | 5/1998 | Herz et al. | 455/4.2 |
| 5,794,178 | 8/1998 | Caid et al. | 704/9 |
| 5,797,753 | 8/1998 | Griswold et al. | 434/322 |
| 5,797,754 | 8/1998 | Griswold et al. | 434/322 |
| 5,810,605 | 9/1998 | Siefert | 404/362 |

COMPUTER-AIDED LEARNING SYSTEM AND METHOD

CROSS-REFERENCE TO RELATED APPLICATIONS

This is a continuation-in-part application of the following allowed U.S. patent applications:

Ser. No. 08/618,193, filed on Mar. 19, 1996 U.S. Pat. No. 5,779,486, entitled, Methods and apparatus to assess and enhance a student's understanding in a subject (the "Test Application");

Ser. No. 08/633,582, filed on Apr. 17, 1996 U.S. Pat. No. 5,743,746, entitled, Reward enhanced learning system and method (the "Reward Application");

Ser. No. 08/664,023, filed on May 28, 1996 U.S. Pat. No. 5,727,951, entitled, Relationship-based computer-aided-educational system (the "Relationship Application");

Ser. No. 08/675,391, filed on Jul. 2, 1996 U.S. Pat. No. 5,863,208, entitled, Learning system and method based on review (the "Review Application"); and Ser. No. 08/707,189, filed on Sep. 3, 1996 U.S. Pat. No. 5,743,743, entitled, Learning method and system that restricts entertainment (the "Restrict Application").

All of the above allowed co-pending applications are incorporated by reference into this specification.

BACKGROUND OF THE INVENTION

The present invention relates generally to learning and more particularly to using a computer to enhance learning.

The foundation of a vibrant society depends on skilled workers. To strengthen this foundation, every year the U.S. Government with the private industry have poured billions and billions of dollars to improve on learning systems and methods. Money has been spent in areas such as laboratory facilities, educational materials, teacher recruitment and retention, and others. However, for decades, the way to test a student has remained the same; learning has been treated typically as a reward in itself; a fixed syllabus usually controls the educational process of a subject without taking into account students' individual progress; what students have learnt are rarely selectively reviewed; and typically, the students can access non-educational materials when they should be using computers to learn.

It should be obvious that we need methods and systems that are based on computers to remedy the above deficiencies.

SUMMARY OF THE INVENTION

In one embodiment, the present invention provides a learning method and system that assess and enhance a student's or a user's understanding in a subject. Based on the user's understanding, individually-tailored tests are generated, whose difficulties can be geared towards the user's level of understanding in the subject. The user not only can use the tests to prepare for an examination, but can also use the tests to learn the subject.

In another embodiment, the invented method and system are based on the latest test results from the latest test taken by the user on the subject, which can be divided into line-items. Each line-item covers one area in the subject. In yet another embodiment, at least one line-item is more difficult than another line-item. The latest test includes questions from different line-items.

In one embodiment, the invented system includes a score generator coupled to a recommendation generator. In one embodiment, the recommendation generator includes an inference engine; and in another embodiment, the recommendation generator includes a pre-requisite analyzer. The recommendation generator can be coupled to a report generator and a question generator.

In one embodiment, the score generator accesses the user's latest test result and his prior-to-the-latest test results from a storage medium to generate an overall score for each set of questions related to the same line-item. In one embodiment, the prior-to-the-latest test results are test results from the test immediately before the latest test. In another embodiment, each overall score reflects the user's degree of forgetfulness as a function of time for that group of questions. Based on the calculated overall scores, the score generator updates information in the storage medium to include the latest test results.

Both the pre-requisite analyzer and the inference engine in the recommendation generator can generate recommendations based on the user's test results. The prerequisite analyzer accesses pre-requisite rules, which, based on the complexity levels of the line items, determines a complexity-hierarchy among the line-items. Then, applying the complexity-hierarchy to the test results, the pre-requisite analyzer determines the user's level of understanding in the subject to provide recommendations for the user which, for example, can be providing suggestions to the user as to the line-item to work on.

The inference engine accesses a set of relationship rules that define relationship among the line items and the subject. Then applying the set of relationship rules to the user's test results, the inference engine determines the user's level of understanding in the subject to provide recommendations for the user.

If there is any conflict among one or more relationship rules with the contents in the test results, or if there is any conflict among two or more relationship rules, the inference engine can resolve it. Resolving such conflicts helps to ensure a consistent assessment of the user's understanding in the subject.

In one embodiment, the report generator accesses a report format. Based on the recommendations and the report format, the report generator generates a report, which can provide assessment of the user's understanding in line-items of the latest test and the prior-to-the-latest tests, and which can provide action items to improve on the user's understanding in the subject.

The question generator, based on the recommendations, generates a number of questions, which, in another embodiment, can be categorized into at least two line items-one being the one suggested by the recommendations, and the other being different from the one suggested by the recommendations. The user can take this new set of questions to further enhance his understanding in the subject.

In one embodiment, the invented system and method enhance a user's understanding in a subject through associating the subject's different areas that the user has studied.

The subject can be divided into line-items and relationship-items. Each relationship-item covers areas that relate two or more items. The items include learnt and un-learnt items, with a learnt item being an item that the user has achieved a preset level of learning, and with an un-learnt item being an item that the user has not yet achieved a preset level of learning.

In one embodiment, the recommendation generator also selects and classifies the items. That embodiment includes a learning-material generator for generating learning materials for the user.

In one embodiment of the invented method, first, the recommendation generator selects one un-learnt item. After the selection, the learning-material generator generates learning materials for the user to learn the selected item, and the system assesses the user's learning progress in the selected item. If the assessment on the selected un-learnt item is satisfactory, then the recommendation generator classifies one or more relationship-items to be learnt as un-learnt items, with each classified relationship-item relating the selected item with one or more learnt items. The recommendation generator can also re-classify the selected item as a learnt item. Then, another un-learnt item can be selected, which can be a line-item, or a relationship-item. The process can continue on until all of the items have been learnt. At that point, the user has mastered the subject.

There are different ways for the recommendation generator to select an unlearnt item. In one embodiment, the recommendation generator selects an unlearnt line-item or an un-learnt relationship-item, depending on a value set by an instructor. If the un-learnt item is a line-item, the process to select a line-item can be based on the difficulty level of the line-item; if the un-learnt item is a relationship-item, the selection process can be based on the difficulty level of the relationship-item, the time the relationship-item was classified as an un-learnt item, and/or whether the user has previously failed to learn the relationship-item.

For the learning materials, in one embodiment, the learning material includes questions. In another embodiment, the learning material does not include questions.

One embodiment of the invented system and method provide users dynamic reviews. After a user has learnt certain areas in a subject, summarized learning materials on those areas can be selectively generated for the user so as to reinforce the user's learning in the subject through reviews. Unlike prior systems, the reviews in the present invention can be dynamic; they can be specifically tailored to the needs of individual users, or the characteristics of the subject.

In one embodiment, the present invention selects an un-learnt item, and generates detailed learning materials for it. Then a learnt item is selected, for example, based on one or more learnt-item-selection rules, depending on factors such as the time elapsed from the time when the user learnt that item, the level achieved by the user in learning that item, its difficulty level, whether that learnt item is related to the selected un-learnt item, and whether that learnt item has been selected before. Then, the invention generates summarized-learning materials on the selected learnt item for the user to review.

Different materials are applicable for learning. For example, the summarized-learning materials may or may not include questions.

For an un-learnt item, after presenting the generated learning material to the user, the present invention can assess the user's understanding in the item. If the assessment is satisfactory, the un-learnt item can be re-classified as a learnt item.

In another embodiment, the present invention accesses an item probability value to select an item. If the item is an un-learnt item, the invention can generate detailed learning materials for the user; and if the user is successful in learning the materials, the invention can re-classify the item as a learnt item. If the item is a learnt item, the invention can generate summarized learning materials for the user. The invention then can repeat and select another item.

In one embodiment, the present invention enriches a user's learning process through individualizing rewards. The invention allows an instructor or a user to set when and what to reward. The invention also allows a user or the user to delay receiving the reward.

In one embodiment, the invented system teaches the user a subject. The subject is divided into line-items, with at least one line-item being more difficult than another line-item. The instructor, such as the user's teacher, guardian or parent, enters his password into the invented system. If the password matches the instructor's password stored in the system, the instructor has gained access into the system, and can set each line-item where there should be a milestone. The system also can provide a list of pre-selected rewards for the instructor to pick the reward at each milestone. The list or a part of the list can depend on the user's preference. The system can then generate a milestone/reward table, capturing the instructor's inputs.

In one embodiment, the recommendation generator accesses the table, and determines if the user has reached any one of the milestones set by the instructor. This determination process can be accomplished in a number of ways; for example, it can be done through one or more rules pre-stored in the system. Such information can then be transmitted to a reward determinator.

The reward determinator based on the information in the reward table can determine the type of reward for the user who has reached a milestone. In one embodiment, there are two types of rewards. The first type is a point system, and the second type is an actual reward. The user can accumulate points or get an actual reward. It would be up to the user to decide. If the user's preference is to pick an actual reward, the user can postpone receiving the reward. If the user's preference is to pick the point system, his points can be accumulated as he gets more points through reaching more milestones.

In one embodiment, the report generator accesses the user's preference and the milestone reached by the user from the reward determinator. The generator stores the milestone-reached in the storage medium, and accesses from the storage medium the history of the milestones reached by the user. In one embodiment, based on the accessed information, a report is generated every time the user reaches a milestone. In another embodiment, the instructor can query the report generator to find out about the user's performance. Based on the report, if the user picks points as rewards, then based on the accumulated points, rewards can be set by the instructor accordingly.

If the user does not want to postpone getting the reward, a reward generator generates the reward for the user. Depending on the type of reward, in one embodiment, the reward generator accesses the reward from a reward storage medium; and in another embodiment, the reward generator accesses the reward from a network.

After the user has claimed the reward, the system can ask for the user's feedback as to his interest in the reward. This information is also sent to the report generator to be presented in the report so that the instructor knows whether she should adjust the rewards for future milestones.

If the user has postponed receiving his reward and later decides to re-claim it, he can enter his password into the system. If the password matches the user's password stored in the system, the user can re-claim his postponed rewards.

In one embodiment, the invention provides rewards when the user has demonstrated understanding in the subject through tests, not just when the system has presented instructional materials. That embodiment requires feedback from the user, with rewards reflecting on the user's understanding.

In one embodiment, the invented method and system help a user focus on study materials by restricting him from freely enjoying entertainment materials on the computer. With such an invention, the user is not distracted by entertainment materials on the computer when he should be working on the study materials. Even if he wants to play, he has to finish studying first.

In one embodiment, the entertainment materials are presented through an entertainment program, and the study materials are presented through a study program.

In one embodiment, the invented system includes an access filter between the programs and a device. The entertainment program needs the device to entertain. A controller controls the access filter to automatically restrict the coupling between the device and the entertainment program, but simultaneously allow the coupling between the device and the study program.

Different entertainment materials typically require different types of devices to entertain. Some examples of devices required by entertainment materials include speakers, a position-pointing device such as a joy-stick, an output device, a storage medium and a circuit board. The circuit board can be used to couple to video-signals, audio-signals or other digital or analog signals. The video-signals can be television signals.

In one embodiment, the access filter includes a device driver.

Under a predetermined condition, the controller removes the restriction automatically to allow the device to couple to the entertainment program. This can be done through a token system. Under the predetermined condition, the user is given a token, which the user can use to remove the restriction. With the restriction removed, the user can enjoy the entertainment materials.

These predetermined condition can be based on one or more factors, such as the amount of time the user has been working on the study materials, the user's performance in the study materials, and the time of day. In one embodiment, one predetermined condition is a user has claimed a corresponding reward.

Other aspects and advantages of the present invention will become apparent from the following detailed description, which, when taken in conjunction with the accompanying drawings, illustrates by way of example the principles of the invention.

DETAILED DESCRIPTION OF THE INVENTION

Figure 1:
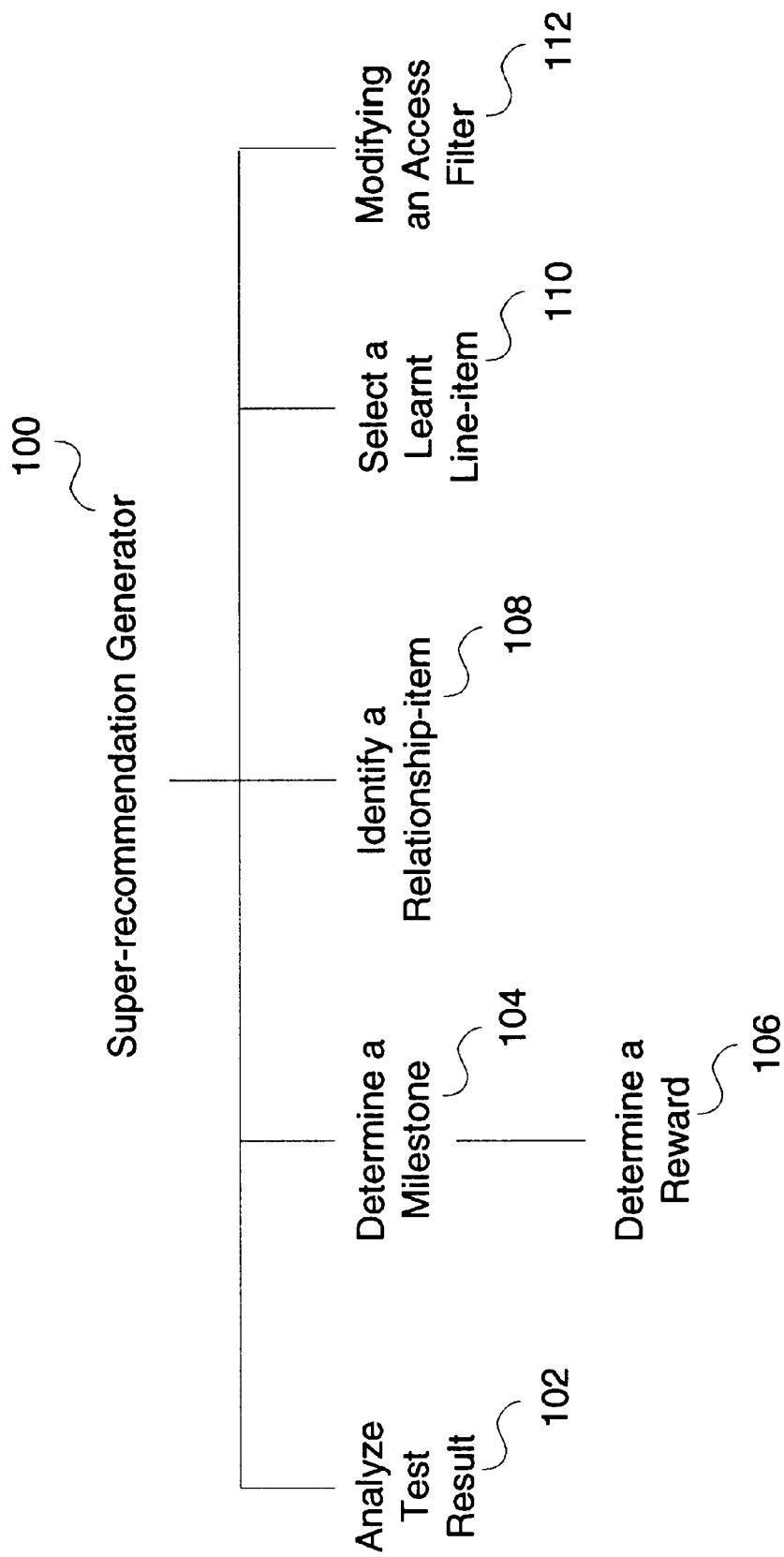
FIG. 1 illustrates one embodiment of the present invention. However, those skilled in the art will readily appreciate that the detailed description given herein with respect to the figure is for explanatory purposes as the invention extends beyond these limited embodiments.

FIG. 1 shows one embodiment of the invention including a super-recommendation generator 100 for implementing a computer-aided learning method to help a student or a user learn a subject. The generator 100 in general is for enhancing the learning experience of the user, and can be implemented in software, firmware, hardware or some combination of the above.

In one embodiment, the subject can be divided into items, including one or more relationship-items, with each relationship-item relating two or more items. The items can include learnt and un-learnt items, with a learnt item being an item that the user has achieved a preset level of learning, and with an un-learnt item being an item that the user has not yet achieved a preset level of learning.

In one embodiment, the super-recommendation generator 100 performs a number of functions, including the following:

assessing a user's understanding in a subject as, for example, described in the Test Application;

rewarding the user who has reached one or more milestones in the subject as, for example, described in the Reward Application;

furthering the user's understanding in the subject through relationship learning, as, for example, described in the Relationship Application;

reinforcing the user's understanding in the subject through reviews, as, for example, described in the Review Application; and restricting the user from enjoying entertainment materials under certain condition, with the entertainment material requiring a device to fulfill its entertainment purpose, as, for example, described in the Restrict Application.

One embodiment of the super-recommendation generator is configured to perform the following operations:

analyzing (102) the user's prior-to-the-latest and the latest test results to assess the user's understanding in the subject, as, for example, described in the Test Application;

determining (104) whether the user has reached a milestone, as, for example, described in the Reward Application;

determining a reward (106) for the user that has reached a milestone, with the reward depending on the user's preference, as, for example, described in the Reward Application;

identifying (108) a relationship-item to be learnt, with the identified relationship-item relating an item and a learnt item, as, for example, described in the Relationship Application;

selecting (110) a learnt item to be reviewed, as described, for example, in the Review Application; and modifying (112) an access filter to restrict coupling between the device and the entertainment materials, with the restriction removed to allow coupling between the device and the entertainment materials under a predetermined condition.

In another embodiment, the super-recommendation generator is configured to perform only some of the operations, with the subject categorized accordingly. For example, the generator 100 is configured not to perform the function of modifying an access filter. In another example, the generator 100 is configured to assess (102), identify a relationship-item (108) and reinforce through reviews (110). In yet another example, the generator 100 is configured to perform similar functions as the previous example, except for the function of assessment, in which the generator 100 analyzes the user's test results using a set of analysis rules to determine the user's understanding level in the subject. In a further example, the super-recommendation generator is configured to assess (102), determine (104) if the user has reached a milestone, and determine (106) a reward; for this example, the subject can be categorized to include one or more milestone.

Note that in one embodiment, computer can be defined as a machine that can perform a computable function, which can be defined as a function that can be performed by a Turing machine or its equivalence.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

We claim:

1. A computer-aided learning method that assesses a user's understanding in a subject through testing the user, rewards the user who has reached one or more milestones in the subject, furthers the user's understanding in the subject through relationship learning, reinforces the user's understanding in the subject through reviews, and restricts the user from enjoying entertainment materials under certain condition, with the entertainment materials requiring a device to fulfill its entertainment purpose, with the subject divided into items, including one or more relationship-items,
with each relationship-item relating two or more items, and
with the items including learnt and un-learnt items, the method comprising the steps of:
analyzing the user's prior-to-the-latest and the latest test results to assess the user's understanding in the subject, and to determine whether the user has reached a milestone;
determining a reward for the user that has reached a milestone, with the reward depending on the user's preference;
identifying a relationship-item to be learnt, with the identified relationship-item relating an item and a learnt item;
selecting a learnt item to be reviewed; and
modifying an access filter to restrict coupling between the device and the entertainment materials, with the restriction removed to allow coupling between the device and the entertainment materials under a predetermined condition.

2. A computer-aided learning method that assesses a user's understanding in a subject through testing the user, rewards the user who has reached one or more milestones in the subject, furthers the user's understanding in the subject through relationship learning, and reinforces the user's understanding in the subject through reviews, with the subject divided into items, including one or more relationship-items,
with each relationship-item relating two or more items, and
with the items including learnt and un-learnt items, the method comprising the steps of:
analyzing the user's prior-to-the-latest and the latest test results to assess the user's understanding in the subject, and to determine whether the user has reached a milestone;
determining a reward for the user that has reached a milestone, with the reward depending on the user's preference;
identifying a relationship-item to be learnt, with the identified relationship-item relating an item and a learnt item; and
selecting a learnt item to be reviewed.

3. A computer-aided learning method that assesses a user's understanding in a subject through testing the user, furthers the user's understanding in the subject through relationship learning, and reinforces the user's understanding in the subject through reviews, with the subject divided into items, including one or more relationship-items,
with each relationship-item relating two or more items, and
with the items including learnt and un-learnt items, the method comprising the steps of:
analyzing the user's prior-to-the-latest and the latest test results to assess the user's understanding in the subject;
identifying a relationship-item to be learnt, with the identified relationship-item relating an item and a learnt item; and
selecting a learnt item to be reviewed.

4. A computer-aided learning method that furthers the user's understanding in the subject through relationship learning, and reinforces the user's understanding in the subject through reviews, with the subject divided into items, including one or more relationship-items,
with each relationship-item relating two or more items, and
with the items including learnt and un-learnt items, the method comprising the steps of:
identifying a relationship-item to be learnt, with the identified relationship-item relating an item and a learnt item; and
selecting a learnt item to be reviewed.

5. A computer-aided learning method that assesses a user's understanding in a subject through testing the user, and rewards the user who has reached one or more milestones in the subject, the method comprising the steps of:
analyzing the user's prior-to-the-latest and the latest test results to assess the user's understanding in the subject, and to determine whether the user has reached a milestone; and
determining a reward for the user that has reached a milestone, with the reward depending on the user's preference.

6. A computer-aided learning method that rewards the user who has reached one or more milestones in the subject, and restricts the user from enjoying entertainment materials under certain condition, with the entertainment materials requiring a device to fulfill its entertainment purpose, the method comprising the steps of:
determining whether the user has reached a milestone;
determining a reward for the user that has reached a milestone, with the reward depending on the user's preference; and modifying an access filter to restrict coupling between the device and the entertainment materials, with the restriction removed to allow coupling between the device and the entertainment materials under a predetermined condition.

7. A computer-aided learning system that assesses a user's understanding in a subject through testing the user, rewards the user who has reached one or more milestones in the subject, furthers the user's understanding in the subject through relationship learning, reinforces the user's understanding in the subject through reviews, and restricts the user from enjoying entertainment materials under certain condition, with the entertainment materials requiring a device to fulfill its entertainment purpose, with the subject divided into items, including one or more relationship-items, with each relationship-item relating two or more items, and with the items including learnt and un-learnt items, the system comprising a super-recommendation generator configured to:

analyze the user's prior-to-the-latest and the latest test results to assess the user's understanding in the subject, and to determine whether the user has reached a milestone;

determine a reward for the user that has reached a milestone, with the reward depending on the user's preference;

identify a relationship-item to be learnt, with the identified relationship-item relating an item and a learnt item;

select a learnt item to be reviewed; and modify an access filter to restrict coupling between the device and the entertainment materials, with the restriction removed to allow coupling between the device and the entertainment materials under a predetermined condition.

8. A computer-aided learning system that assesses a user's understanding in a subject through testing the user, rewards the user who has reached one or more milestones in the subject, furthers the user's understanding in the subject through relationship learning, and reinforces the user's understanding in the subject through reviews, with the subject divided into items, including one or more relationship-items, with each relationship-item relating two or more items, and with the items including learnt and un-learnt items, the system comprising a super-recommendation generator configured to:

analyze the user's prior-to-the-latest and the latest test results to assess the user's understanding in the subject, and to determine whether the user has reached a milestone;

determine a reward for the user that has reached a milestone, with the reward depending on the user's preference;

identify a relationship-item to be learnt, with the identified relationship-item relating an item and a learnt item; and select a learnt item to be reviewed.

9. A computer-aided learning system that assesses a user's understanding in a subject through testing the user, furthers the user's understanding in the subject through relationship learning, and reinforces the user's understanding in the subject through reviews, with the subject divided into items, including one or more relationship-items, with each relationship-item relating two or more items, and with the items including learnt and un-learnt items, the system comprising a super-recommendation generator configured to:

analyze the user's prior-to-the-latest and the latest test results to assess the user's understanding in the subject;

identify a relationship-item to be learnt, with the identified relationship-item relating an item and a learnt item; and select a learnt item to be reviewed.

10. A computer-aided learning system that furthers the user's understanding in the subject through relationship learning, and reinforces the user's understanding in the subject through reviews, with the subject divided into items, including one or more relationship-items, with each relationship-item relating two or more items, and with the items including learnt and un-learnt items, the system comprising a super-recommendation generator configured to:

identify a relationship-item to be learnt, with the identified relationship-item relating an item and a learnt item; and select a learnt item to be reviewed.

11. A computer-aided learning system that assesses a user's understanding in a subject through testing the user, and rewards the user who has reached one or more milestones in the subject, the system comprising a super-recommendation generator configured to:

analyze the user's prior-to-the-latest and the latest test results to assess the user's understanding in the subject, and to determine whether the user has reached a milestone; and determine a reward for the user that has reached a milestone, with the reward depending on the user's preference.

12. A computer-aided learning system that rewards the user who has reached one or more milestones in the subject, and restricts the user from enjoying entertainment materials under certain condition, with the entertainment materials requiring a device to fulfill its entertainment purpose, the system comprising a super-recommendation generator configured to:
- determine whether the user has reached a milestone;
- determine a reward for the user that has reached a milestone, with the reward depending on the user's preference; and
- modify an access filter to restrict coupling between the device and the entertainment materials, with the restriction removed to allow coupling between the device and the entertainment materials under a predetermined condition.

13. A computer-aided learning method for assessing a user's understanding in a subject through testing the user, furthering the user's understanding in the subject through relationship learning, and reinforcing the user's understanding in the subject through reviews, with the subject divided into items, including one or more relationship-items,
- with each relationship-item relating two or more items, and
- with the items including learnt and un-learnt items, the method comprising the steps of:
- presenting, by a first computer, a report on the assessment of the user's understanding in the subject, based on analyzing the user's prior-to-the-latest and the latest test results by another computer;
- presenting, by the first computer, materials on a relationship-item to be learnt after the relationship-item has been identified by the other computer, with the identified relationship-item relating an item and a learnt item; and
- presenting, by the first computer, materials on a learnt item to be reviewed after the learnt item has been selected by the other computer.

14. A computer-aided learning method for furthering a user's understanding in the subject through relationship learning, and reinforcing the user's understanding in the subject through reviews, with the subject divided into items, including one or more relationship-items,
- with each relationship-item relating two or more items, and
- with the items including learnt and un-learnt items, the method comprising the steps of:
- presenting, by a first computer, materials on a relationship-item to be learnt after the relationship-item has been identified by another computer, with the identified relationship-item relating an item and a learnt item; and
- presenting, by the first computer, materials on a learnt item to be reviewed after the learnt item has been selected by the other computer.

15. A computer-aided learning method for assessing a user's understanding in a subject through testing the user, and rewarding the user who has reached one or more milestones in the subject, the method comprising the steps of:
- presenting, by a first computer, a report on the assessment of the user's understanding in the subject, based on analyzing the user's prior-to-the-latest and the latest test results by another computer; and
- presenting, by the first computer, information related to a reward for the user that has reached a milestone, based on determining the reward, and determining the user having reached the milestone by the other computer, with the reward depending on the user's preference.

16. A computer-aided learning method for rewarding the user who has reached one or more milestones in the subject, and restricting the user from enjoying entertainment materials under certain condition, with the entertainment materials requiring a device to fulfill its entertainment purpose, the method comprising the steps of:
- presenting, by a computer, information related to a reward for the user that has reached a milestone, based on determining the reward, and determining the user having reached the milestone by another computer, with the reward depending on the user's preference; and
- modifying an access filter to restrict coupling between the device and the entertainment materials, with the restriction removed to allow coupling between the device and the entertainment materials under a predetermined condition.

17. A computer-aided learning method for reinforcing a user's understanding in a subject through reviews, with the subject divided into items, including learnt items and un-learnt items, the method comprising the step of:

presenting, by a first computer, summarized materials on a learnt item to be reviewed after the item has been selected and materials generated by another computer;

such that although the user has previously learnt an item, that learnt item still might be selected with materials generated for the user so as to reinforce the user's understanding in the subject through reviews.

18. A computer-aided learning method for rewarding a student who has reached a milestone in a subject, which is divided into items, the method comprising the step of:

presenting, by a computer, information related to a reward for the user that has reached a milestone, based on determining the reward, and determining the user having reached the milestone by another computer, with the reward depending on the user's individual preference specifically tailored to the interest of the user.

19. A computer-aided learning method for assessing a user's understanding in a subject through testing the user, the method comprising the step of:

presenting, by a computer, a report on the assessment of the user's understanding in the subject, based on analyzing the user's prior-to-the-latest and the latest test results by another computer, with a reward for the user determined wherein the reward depends on the user's preference.

* * * * *